United States Patent
Wang et al.

(10) Patent No.: US 9,485,701 B2
(45) Date of Patent: Nov. 1, 2016

(54) BALANCING PAGING LOAD AND TRACKING AREA UPDATES

(71) Applicant: INTERDIGITAL TECHNOLOGY CORPORATION, Wilmington, DE (US)

(72) Inventors: Peter S. Wang, E. Setauket, NY (US); Rajat P. Mukherjee, Toronto (CA); Jin Wang, Princeton, NJ (US); Shankar Somasundaram, Sunnyvale, CA (US); James M. Miller, Verona, NJ (US); Ulises Olvera-Hernandez, Kirkland (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 14/660,450

(22) Filed: Mar. 17, 2015

(65) Prior Publication Data

US 2015/0195761 A1 Jul. 9, 2015

Related U.S. Application Data

(63) Continuation of application No. 13/925,116, filed on Jun. 24, 2013, now Pat. No. 8,989,744, which is a continuation of application No. 12/044,491, filed on Mar. 7, 2008, now Pat. No. 8,472,956.

(60) Provisional application No. 60/893,640, filed on Mar. 8, 2007.

(51) Int. Cl.
*H04W 36/22* (2009.01)
*H04W 4/08* (2009.01)
(Continued)

(52) U.S. Cl.
CPC .............. *H04W 36/22* (2013.01); *H04W 4/08* (2013.01); *H04W 8/186* (2013.01); *H04W 36/36* (2013.01);
(Continued)

(58) Field of Classification Search
CPC ... H04W 36/30; H04W 36/18; H04W 36/08; H04W 36/14; H04W 36/12; H04W 36/22; H04W 36/32; H04W 4/08; H04W 8/186; H04W 8/205; H04W 68/00; H04W 84/105; H04W 84/042; H04W 76/086
See application file for complete search history.

(56) References Cited

U.S. PATENT DOCUMENTS 6,330,446 B1  12/2001  Mori
6,751,460 B2   6/2004  Korpela et al.
(Continued)

FOREIGN PATENT DOCUMENTS

CN   101136826 A   3/2008
EP   1 677 557      7/2006
(Continued)

OTHER PUBLICATIONS

Ericsson, "Tracking Area Concept", 3GPP TSG-RAN WG2#56bis, R2-070222, Jan. 15-19, 2007.*
(Continued)

*Primary Examiner* — Ted Wang
(74) *Attorney, Agent, or Firm* — Volpe and Koenig, P.C.

(57) ABSTRACT

A method for assigning a tracking area (TA) is disclosed. A mobility state of a wireless transmit/receive unit (WTRU) is determined and the TA is assigned based on the determined mobility state. Also disclosed is a method for accessing a closed subscriber group (CSG) TA. A CSG TA identifier is received at a WTRU and is stored. A CSG TA broadcast is received and the broadcast CSG TA is accessed if an identifier of the broadcast CSG TA matches the stored CSG TA identifier. Also disclosed is a method for changing a mobility state of a WTRU. A current mobility state of the WTRU is determined and a predetermined metric of the WTRU is examined. The predetermined metric is evaluated to determine if the metric has crossed a threshold and the mobility state is changed based on the evaluated metric.

20 Claims, 4 Drawing Sheets

(51) Int. Cl.
  *H04W 8/18* (2009.01)
  *H04W 68/00* (2009.01)
  *H04W 84/10* (2009.01)
  *H04W 36/36* (2009.01)
  *H04W 76/06* (2009.01)
  *H04W 8/20* (2009.01)
  *H04W 84/04* (2009.01)

(52) U.S. Cl.
  CPC ........... *H04W 68/00* (2013.01); *H04W 76/068* (2013.01); *H04W 84/105* (2013.01); *H04W 8/205* (2013.01); *H04W 84/042* (2013.01)

(56) References Cited

U.S. PATENT DOCUMENTS

| | | |
|---|---|---|
| 7,043,255 B1 | 5/2006 | Tiwari |
| 7,110,765 B2 | 9/2006 | Amerga et al. |
| 7,359,713 B1 | 4/2008 | Tiwari |
| 2003/0013444 A1 | 1/2003 | Watanabe et al. |
| 2003/0040314 A1 | 2/2003 | Hogan et al. |
| 2003/0045291 A1 | 3/2003 | Watanabe |
| 2003/0096612 A1 | 5/2003 | Kim et al. |
| 2003/0129995 A1 | 7/2003 | Niwa et al. |
| 2004/0053626 A1 | 3/2004 | Yagi |
| 2004/0198353 A1 | 10/2004 | Quick |
| 2005/0054349 A1 | 3/2005 | Balachandran et al. |
| 2005/0090278 A1 | 4/2005 | Jeong et al. |
| 2005/0186984 A1 | 8/2005 | Lundell et al. |
| 2006/0085163 A1 | 4/2006 | Nader |
| 2006/0199591 A1 | 9/2006 | Klatt |
| 2006/0258386 A1 | 11/2006 | Jeong et al. |
| 2007/0223510 A1 | 9/2007 | Joo |
| 2007/0232321 A1 | 10/2007 | Casati et al. |
| 2008/0267153 A1 | 10/2008 | Mukherjee et al. |
| 2011/0169460 A1* | 7/2011 | Potter .................. B60K 6/46 320/162 |

FOREIGN PATENT DOCUMENTS

| | | |
|---|---|---|
| EP | 1 879 414 A1 | 1/2008 |
| EP | 2117252 A1 | 11/2009 |
| JP | 61-245639 | 10/1986 |
| JP | 05-145472 | 6/1993 |
| JP | 2000-209638 | 7/2000 |
| JP | 2002-190769 | 7/2002 |
| JP | 2006-060710 | 3/2006 |
| JP | 2006-211335 | 8/2006 |
| KR | 2005-0083260 | 8/2005 |
| WO | 00/54537 | 9/2000 |
| WO | 2006/137779 A1 | 12/2006 |
| WO | 2008/112126 A1 | 9/2008 |

OTHER PUBLICATIONS

Ericsson, "L2 enhancements CR to MAC," 3GPP TSG-RAN2 Meeting #57, R2-071061, St. Louis, USA, (Feb. 12-16, 2007).
Ericsson, "Tracking Area Concept", 3GPP TSG-RAN WG2#56bis, R2-070222, (Sorrento, Italy, Jan. 15-19, 2007).
Ericsson, "Tracking Area Concept," 3GPP TSG SA WG2 Architecture—S2#53, S2-062096 (Jun. 26-30, 2006).
Iera et al., "Handoff Management With Mobility Estimation in Hierarchical Systems," IEEE Transactions on Vehicular Technology, vol. 51, No. 5 (Sep. 2002).
LG Electronics Inc., "UE Assisted Tracking Area Update", 3GPP TSG RAN WG2 #57, R2-070199, (Sorrento, Italy, Jan. 15-19, 2007).
LG Electronics Inc., "UE assisted tracking area update," 3GPP TSG RAN WG2#57bis, R2-071325 (Mar. 26-30, 2007).
Nokia et al., "Tracking Area Concept Alternatives," 3GPP TSG RAN WG3 meeting #53bis, R3-061595 (Oct. 10-13, 2006).
Nokia, "Reselection Procedures (1235)," 3GPP TSG-RAN-WG2 Meeting #46, R2-050663 (Feb. 14-18, 2005).
Pollini, "Trends in Handover Design," IEEE Communications Magazine, pp. 82-90 (Mar. 1996).
Qualcomm Europe, "Camping load balancing in LTE," 3GPP TSG-RAN WG 2 meeting #57-bis, R2-071207 (Mar. 26-30, 2007).
Samsung, "Use of Tracking Area—and Cell Identity," 3GPP TSG-RAN WG2 Meeting #57, R2-070680 (Feb. 12-16, 2007).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.0.0 (Dec. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V8.3.0 (Dec. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, V0.9.0 (Mar. 2007).
Third Generation Partnership Project, "Specification Group Radio Access Network; Evolved Universal Terrestrial Radio Access (E-UTRA) User Equipment (UE) procedures in idle mode (Release 8)," 3GPP TS 36.304 V2.0.0 (Oct. 2007).
Third Generation Partnership Project, "Technical Specification Group Radio Access Network; User Equipment (UE) procedures in idle mode and procedures for cell reselection in connected mode (Release 1999)," 3GPP TS 25.304 V3.14.0 (Mar. 2004).
Third Generation Partnership Project, "Technical Specification Group Radio Access Network; User Equipment (UE) procedures in idle mode and procedures for cell reselection in connected mode (Release 4)," 3GPP TS 25.304 V4.8.0 (Mar. 2004).
Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).
Third Generation Partnership Project, "Technical Specification Group Radio Access Network; User Equipment (UE) procedures in idle mode and procedures for cell reselection in connected mode (Release 6)," 3GPP TS 25.304 V6.9.0 (Mar. 2006).
Third Generation Partnership Project, "Technical Specification Group Radio Access Network; User Equipment (UE) procedures in idle mode and procedures for cell reselection in connected mode (Release 7)," 3GPP TS 25.304 V7.4.0 (Dec. 2007).
Third Generation Partnership Project, "Technical Specification Group Radio Access Network; User Equipment (UE) procedures in idle mode and procedures for cell reselection in connected mode (Release 8)," 3GPP TS 25.304 V8.0.0 (Dec. 2007).
Third Generation Partnership Project, "Technical Specification Group Core Network and Terminals; Generic Authentication Architecture (GAA); Zh and Zn Interfaces based on the Diameter protocol; Stage 3 (Release 6)," 3GPP TS 29.109 V6.6.0 (Mar. 2006).
Third Generation Partnership Project, "Technical Specification Group Core Network and Terminals; Generic Authentication Architecture (GAA); Zh and Zn Interfaces based on the Diameter protocol; Stage 3 (Release 6)," 3GPP TS 29.109 V6.8.0 (Dec. 2007).
Third Generation Partnership Project, "Technical Specification Group Core Network and Terminals; Generic Authentication Architecture (GAA); Zh and Zn Interfaces based on the Diameter protocol; Stage 3 (Release 7)," 3GPP TS 29.109 V7.8.0 (Dec. 2007).
Third Generation Partnership Project, "Technical Specification Group Core Network and Terminals; Generic Authentication Architecture (GAA); Zh and Zn Interfaces based on the Diameter protocol; Stage 3 (Release 7)," 3GPP TS 29.109 V7.5.0 (Dec. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP TR 25.813 V7.1.0 (Sep. 2006).
Third Generation Partnership Project, "Technical Specification Group Radio Access Network; Evolved Universal Terrestrial Radio Access (E-UTRA) and Evolved Universal Terrestrial Radio Access

(56) References Cited

OTHER PUBLICATIONS

Network (E-UTRAN); Radio interface protocol aspects (Release 7)," 3GPP TR 25.813 V7.0.0 (Jun. 2006).
Third Generation Partnership Project, "Technical Specification Group Terminals; UICC-terminal interface; Physical and logical characteristics (Release 1999)," 3GPP TS 31.101 V3.3.1 (Dec. 2004).
Third Generation Partnership Project, "Technical Specification Group Terminals; UICC-terminal interface; Physical and logical characteristics (Release 4)," 3GPP TS 31.101 V4.2.1 (Dec. 2004).
Third Generation Partnership Project, "Technical Specification Group Terminals; UICC-terminal interface; Physical and logical characteristics (Release 5)," 3GPP TS 31.101 V5.2.1 (Dec. 2004).
Third Generation Partnership Project, "Technical Specification Group Core Network and Terminals; UICC-terminal interface; Physical and logical characteristics (Release 6)," 3GPP TS 31.101 V6.5.1 (Jan. 2006).
Third Generation Partnership Project, "Technical Specification Group Core Network and Terminals; UICC-terminal interface; Physical and logical characteristics (Release 7)," 3GPP TS 31.101 V7.0.1 (Jun. 2007).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.0.0 (Dec. 2007).
Universal Mobile Telecommunications System (UMTS); User Equipment (UE) Procedures in Idle Mode and Procedures for Cell Reselection in Connected Mode (3GPP TS 25.304 version 7.1.0 Release 7), ETSI TS 125 304 V7.1.0 (Dec. 2006).
Vodafone Group, "Tracking Areas Concepts", 3GPP TSG RAN WG3 #55, R3-070112, (St. Louce, Feb. 12-16, 2007).
Yang et al., "On the Design of Mobility Management Scheme for 802.16-based Network Environment," Computer Networks, vol. 51, Issue 8, pp. 2049-2066 (Jun. 6, 2007).
ETSI, Universal Mobile Telecommunications Systems (UMTS); Evolved Universal Terrestrial Radio Access (E-UTRA) and Evolved Universal Terrestrial Radio Access (E-UTRAN); Overall description; Stage 2 (3GPP TS 36.300 version 8.1.0 Release 8), ETSI TS 136 300 V8.1.0, pp. 100-101 (Jun. 2007).
Third Generation Partnership Project, "Technical Specification Group Core Network and Terminals; Non-Access-Stratum (NAS) protocol for Evolved Packet System (EPS); Stage 3 (Release 8)," 3GPP TS 24.301 V0.1.0 (Feb. 2008).
Vodaphone, "Manual CSG ID Selection Support", 3GPP TSG-RAN2 Meeting #64-bis, R2-090056; Ljubljana, Slovenia (Jan. 12-16, 2008).

\* cited by examiner

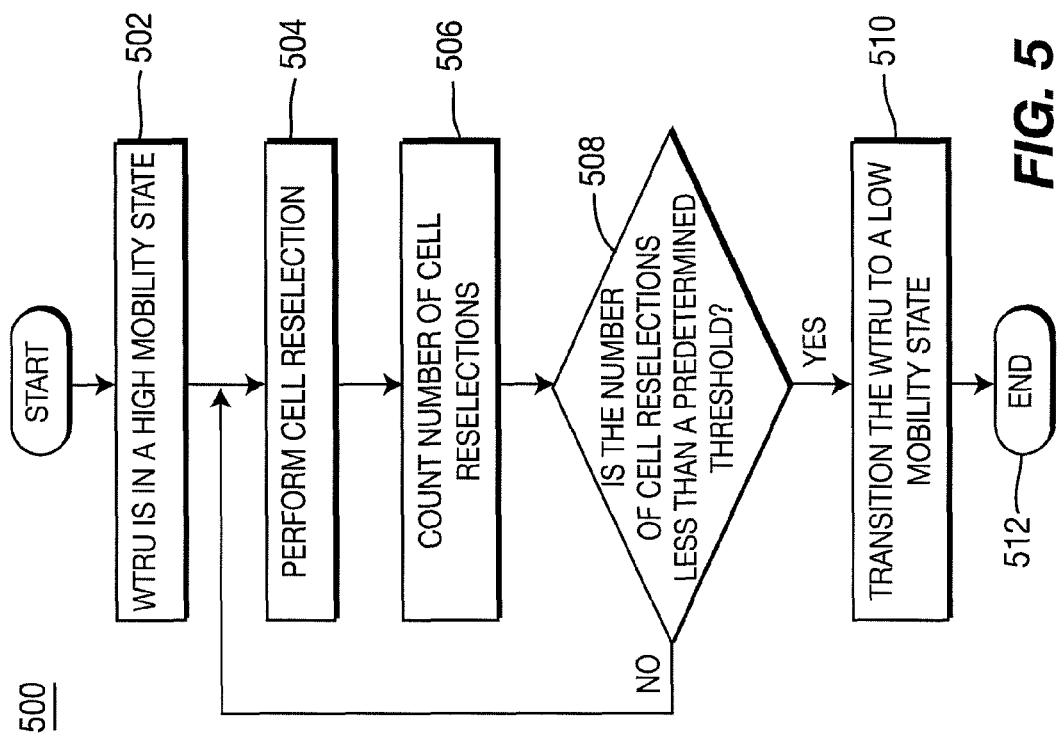
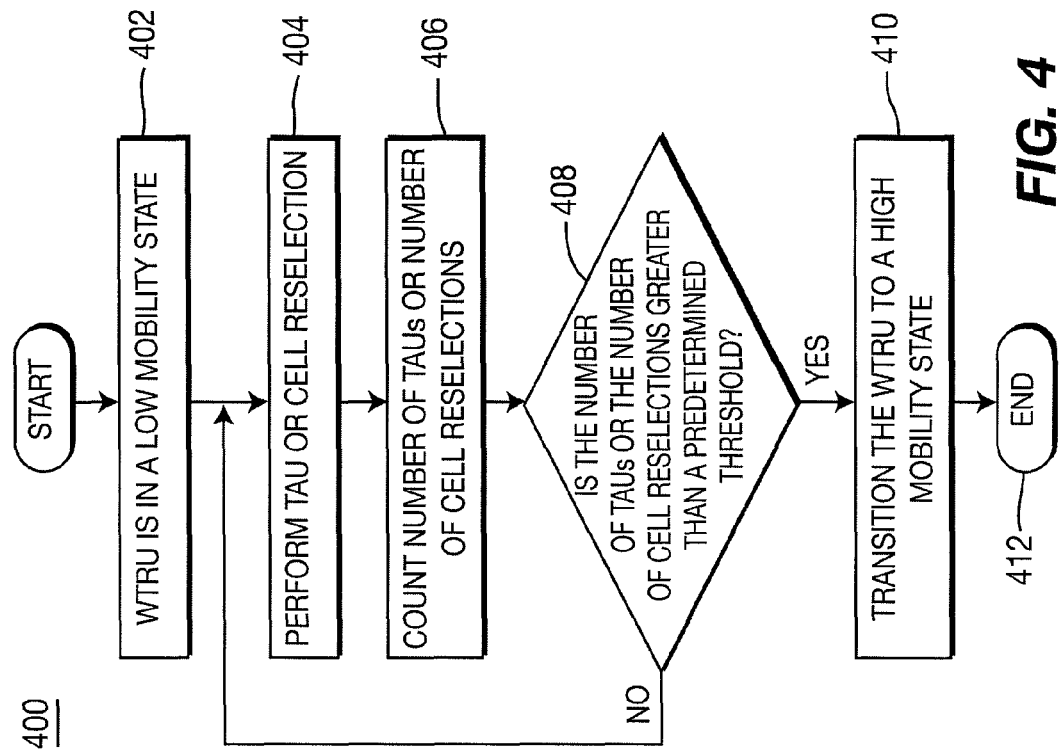

BALANCING PAGING LOAD AND TRACKING AREA UPDATES

CROSS REFERENCE TO RELATED APPLICATIONS

This application is a continuation of U.S. patent application Ser. No. 13/925,116 filed Jun. 24, 2013, which is a continuation of U.S. patent application Ser. No. 12/044,491 filed Mar. 7, 2008, which issued as U.S. Pat. No. 8,472,956 on Jun. 25, 2013, which claims the benefit of U.S. Provisional Application No. 60/893,640, filed Mar. 8, 2007, the contents of which are hereby incorporated by reference herein.

FIELD OF INVENTION

The present invention is related to wireless communications.

BACKGROUND

The third generation partnership project (3GPP) has lately initiated the Long Term Evolution (LTE) program to bring new technology, new network architecture, new configuration, and new applications and services to the wireless cellular network in order to provide improved spectral efficiency and faster user experiences.

In LTE, the tracking area (TA) concept replaces the universal mobile telecommunications system (UMTS) routing area/location area (RA/LA) and UMTS terrestrial radio access network registration area (URA) concepts to simplify the mobile area tracking operations and to reduce the overhead caused by the area updates a wireless transmit/receive unit (WTRU) has to perform. When a WTRU is in the LTE_IDLE state, it is typically not transmitting or receiving any packets. Because the WTRU is not in active communication with a base station or an enhanced Node B (eNB), its location may not be exactly known. A TA represents an area in which the WTRU was last registered, and it is necessary to page the WTRU in the TA to locate the WTRU in a particular cell. A TA update (TAU) is generated when the WTRU crosses the boundary from one TA to another TA.

In WTRU idle mode, the TA concept also includes RA updates (RAU) and LA updates (LAU) or combined RAU/LAU. The current LTE system has defined two TA operational schemes: the "multiple-TA registration" scheme and the "overlapping TA" scheme.

In the "multiple-TA" scheme, an LTE cell belongs to only one TA, but a WTRU can be assigned with more than one TA. If one WTRU is assigned to multiple TAs, the WTRU does not need to perform TAUs when it crosses the boundaries between assigned TAs.

In the "overlapping TA" scheme, one cell can be assigned to multiple TAs (broadcast in system information) and one WTRU is assigned only to one TA. In the overlapped cell, the WTRU does not have to perform a TAU if its assigned TA is in the TA list of the overlapped cell.

Consideration has been given to allocating TAs to reduce the number of TAUs and the consequent signaling overhead to the system. The arrangement and assignment of TAs in the LTE network affects the idle mode paging operation because the WTRU paging is performed by cells in all the assigned TAs. Additionally, in the multiple-TA list scheme, a WTRU may be allocated more than one TA. In the LTE_IDLE state, the network is aware of the WTRU only at a TA level. This means that, for paging and other purposes, the network can only contact the WTRU over all assigned TAs, which may unnecessarily increase the paging load. Further, the criteria and methods used in allocating multiple TAs to a WTRU are unclear.

Recently, there has also been considerable interest regarding "femto-cells". These are cells of a short-range base station that may be deployed in a home or in certain public places (e.g., underground malls, train stations, etc.) to provide cellular coverage in areas that may not be accessible to macro-cells or to provide differentiated charging to users when they are accessing these cells. Such cells are referred to as femto-cells, Home Node B (HNB) cells, Home e-Node B (HeNB) cells or, most commonly, Closed Subscriber Group (CSG) cells.

It would therefore be beneficial to provide a method and apparatus that can provide the network with mobility and positioning information to assist in allocating TAs and also help achieve the best possible balance for the LTE system load between the operations of system paging and the TAUs.

SUMMARY

A method and apparatus for LTE tracking area (TA) operations with the aim of achieving a balanced system paging load and reducing the number of unnecessary tracking area update (TAU) requests are disclosed. The LTE TA operational mobility states, their transitions on the WTRU, and their signaling to the network so that the proper balance can be achieved between the LTE TAU requests and LTE paging operations are also described. Various mechanisms are provided for addressing these issues, including WTRU mobility detection from WTRU positioning measurement results, WTRU cell reselection numbers and the TAU counts, and by the use of adjustable TA timers.

BRIEF DESCRIPTION OF THE DRAWINGS

A more detailed understanding may be had from the following description, given by way of example and to be understood in conjunction with the accompanying drawings, wherein:

FIG. 4 is a flowchart of a method for transitioning a WTRU from a low mobility state to a high mobility state;

FIG. 5 is a flowchart of a method for transitioning a WTRU from a high mobility state to a low mobility state;

DETAILED DESCRIPTION

When referred to hereafter, the term "wireless transmit/receive unit (WTRU)" includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes but is not limited to, a Node B, a site controller, an access point (AP), or any other type of interfacing device capable of operating in a wireless environment.

TA Allocation

At the system level, the following TA allocation principles are used with respect to each of the current TA allocation schemes.

1. When the WTRU is mobile, it should perform as few TAUs as possible to reduce the system signaling load. This means that the TA or TAs should cover as many cells as possible, so that a WTRU reselecting from cell to cell does not trigger a TA update.

2. When the WTRU is relatively stationary, the LTE paging caused by an incoming call to the WTRU should be conducted in as few cells as possible to reduce the paging load system-wide.

To achieve the proper balance of the TA allocation principles, the following TA allocation schemes can be utilized.

1. Multiple TA list scheme. When the WTRU is in the stationary state or in the low mobility state, only one TA is assigned to the WTRU. With only one TA, the WTRU will not incur many TAUs, but the system can page the WTRU in a small scope area in one TA. When the WTRU is in the high mobility state, multiple TAs can be assigned to the WTRU to minimize the number of TAUs. However, each cell belongs to only one TA.

Figure 1:
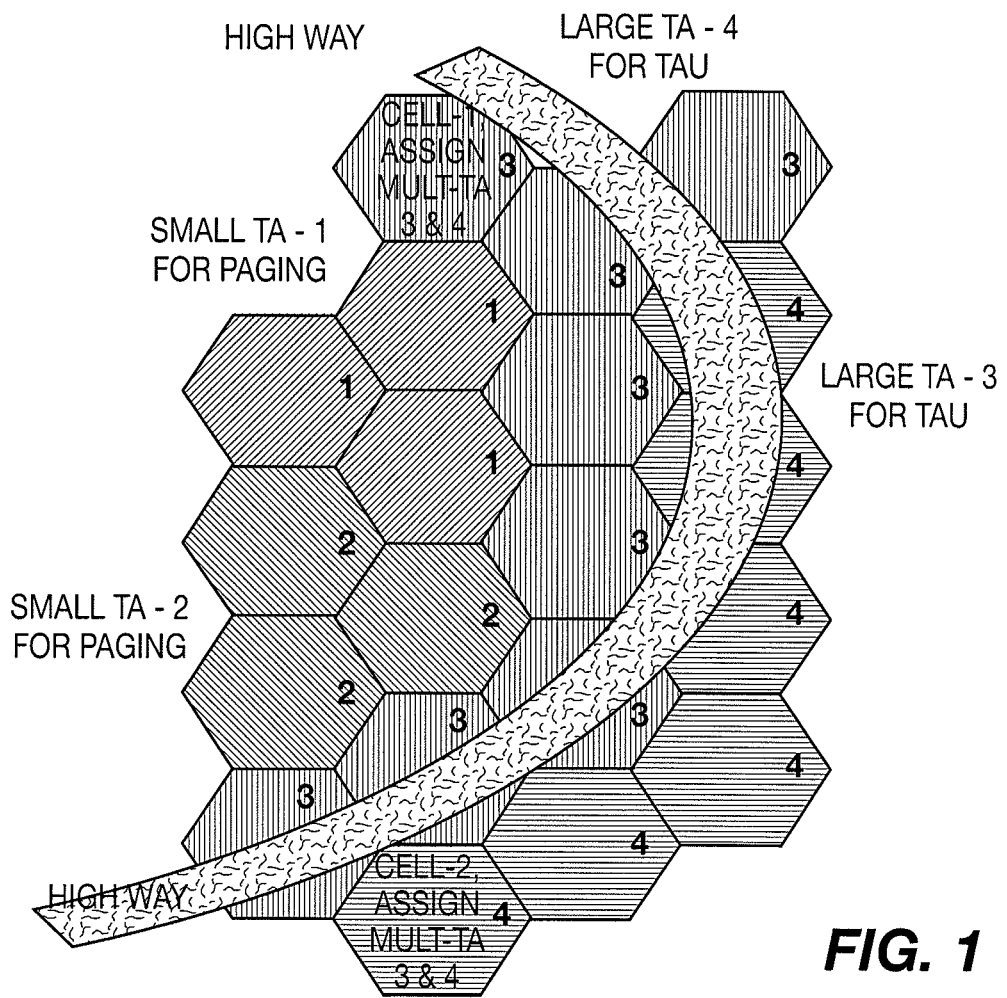
FIG. 1 shows a TA deployment for a multiple TA list scheme.

FIG. 1 shows a TA deployment for a multiple TA list scheme. In particular, FIG. 1 shows the deployment and composition of different TAs, i.e., large TAs and small TAs. A large TA usually covers geographical areas with many cells where the WTRUs generally move fast over a sustained period; for example, in a highway area. In this or similar areas, the TA can be laid over many LTE cells along the moving path. This is shown by the large TA-3 and TA-4 and their associated cells.

Small TAs are generally deployed to places where WTRUs are in low mobility or even stationary, such as small TA-1 and small TA-2. Small TAs can also be deployed adjacent to the high speed areas. Specific cells, such as Cell-1 and Cell-2 in FIG. 1, are located near the entrance to the highway and therefore WTRUs will be assigned to multiple TAs (TA-3 and TA-4) for the high-speed movement with few TAUs.

2. TA overlapping scheme. An individual cell may belong to more than one TA. A two-level TA coverage scheme is employed such that when the WTRU is in a high mobility state, the WTRU is assigned to a TA that covers a large geographical area with many individual LTE cells. With the larger TA, the WTRU does not have to perform many TAUs. When a WTRU is in the low mobility or stationary state, it is assigned to a TA that has a smaller geographical area with a fewer number of cells. The transition between a large TA and a small TA may happen in a cell covered by both TAs.

Figure 2:
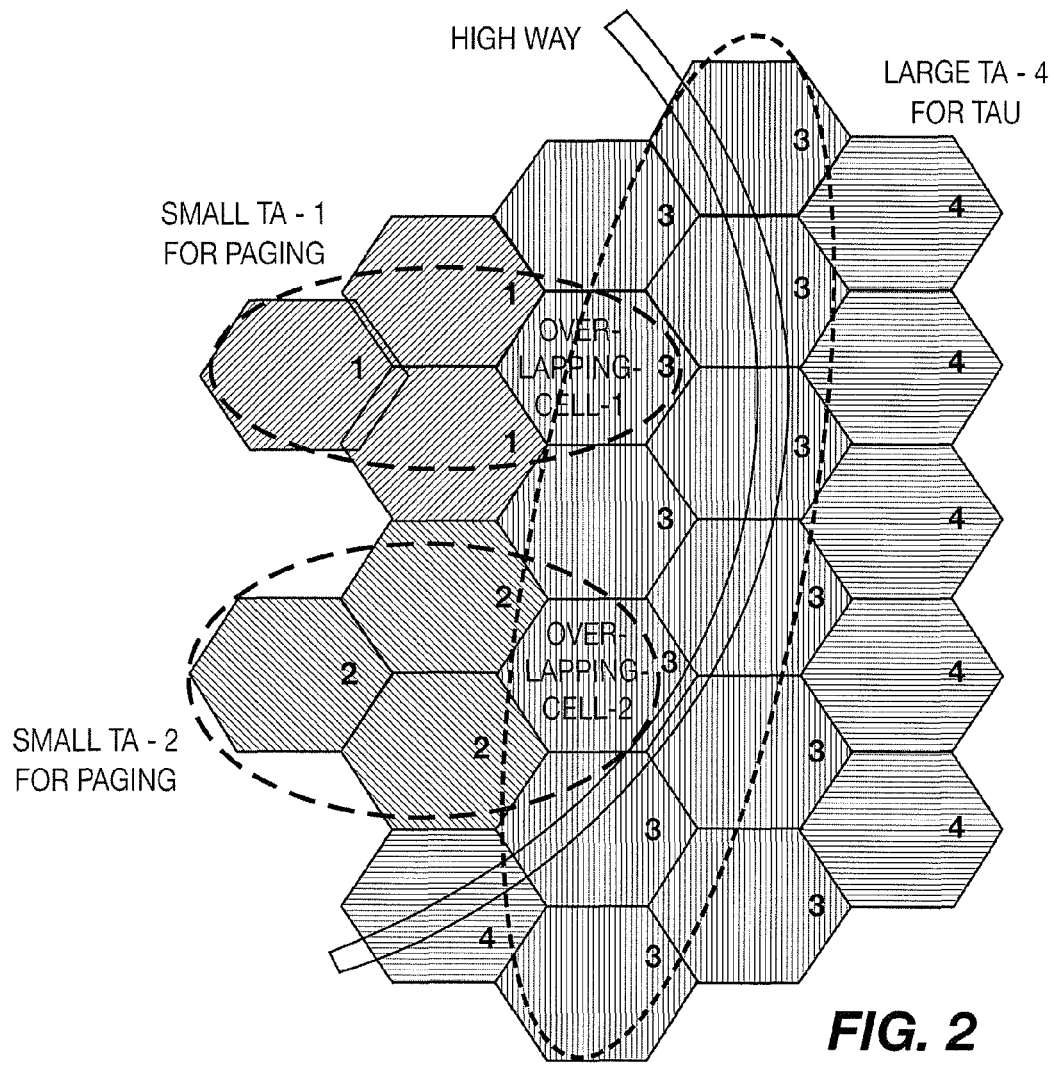
FIG. 2 shows a TA deployment for an overlapping TA scheme.

FIG. 2 shows a TA deployment for an overlapping TA scheme. In particular, a large TA is generally assigned to cover the geographical areas where the WTRU is able to move fast in a sustaining period, for example in the highway area, while small TAs are assigned to the cells where WTRUs are not moving fast. The overlapping cells (for example, Overlapping-Cell-1 and Overlapping-Cell-2 in FIG. 2) situated in both a large TA and a small TA are usually deployed for the small TA (such as in a mall area adjacent to the highway), where many stationary or low mobility WTRUs are camped.

CSG Cell TA

A CSG cell is a very small cell that is usually intended to cover one household worth (for example) of territory. A CSG TA thus represents the TA of one or more small CSG cells covering the small area over which cellular coverage is desired (e.g., a home or underground shopping mall). The only WTRUs that are allowed access to the CSG cells are those WTRUs whose Universal Subscriber Identity Module (USIM or its LTE equivalent or another application residing in the Universal Integrated Circuit Card (UICC) of the WTRU) includes the CSG TA ID(s) of the CSG cell(s).

The CSG TA ID may be similar in structure to a macro-cell TA ID in that the CSG TA ID may be determined be concatenating a CSG TA Code (TAC) and the operator's Public Land Mobile Network (PLMN) ID. The CSG TAC may be the same length as the macro-cell TAC. Alternatively, the CSG TA ID may have a different format, structure, or length than a macro-cell TA ID. The WTRU in its USIM (or in any other application residing in the UICC) may store only a part of the CSG TA ID.

The CSG TA ID may have an indicator field to indicate the CSG cell property/scale. The CSG cell may broadcast the CSG TAC and the PLMN ID in separate fields and the WTRU (e.g., in the NAS layer) may have to construct the CSG TA ID from the broadcast information. The WTRUs with the CSG cell's TA ID in their USIM allowed TA list may belong to a closed subscriber group for the CSG Cell or the HNB.

When a WTRU in Idle Mode detects a CSG cell having a TA ID that is not configured in its USIM (or its LTE equivalent or in another application residing in the UICC), it will not attempt to access that CSG cell and will not perform a TAU procedure. It is proposed that the non-access stratum (NAS) Tracking Area Accept message include new Information Element(s) (IE) which allows the network to configure the WTRU with the TA IDs of the CSG cells that the WTRU has access to. In one implementation, the IE includes the TA ID(s) of the CSG cell(s) that the WTRU has access to.

If a WTRU in Idle Mode detects a CSG cell that has a TA ID which is included in its list of allowed CSG cell TA IDs, but is not included in its allowed list of TA IDs (for signaling free mobility), it may conclude that it has access to this CSG cell but a TAU procedure needs to be triggered upon Idle Mode cell selection/re-selection to this CSG cell. In other words, signaling free mobility (i.e., mobility between two cells belonging to different TAs without performing a TAU procedure) between a macro TA and CSG TA may be permitted only when the CSG TA ID is included explicitly as one of the multiple TAs configured for the WTRU by the network for signaling free mobility (e.g., in the multiple TAs configured in the TAU procedure).

A CSG cell or macro cell may indicate (e.g., using the SIBs on the broadcast channel) whether signaling free mobility is permitted or not. Such an indication may be provided, for example, by a one bit indicator. If a suitable indication is present, the WTRU may camp on the CSG cell without performing a TAU procedure, provided that the CSG TA ID is configured in the WTRU. Alternatively, a WTRU may always camp on a CSG cell without performing a TAU procedure provided that the CSG TA ID is configured in the WTRU. In the absence of such an indication or if the indication is negative, the WTRU may camp on the CSG cell, but will perform a TAU procedure provided that the CSG TA ID is configured in the WTRU.

In order for WTRUs outside the CSG cell TA user group (referred to as "visitor WTRUs") to access the CSG cell TA, they may need to execute a special code (e.g., 511) or a procedure through the operator. An example of a procedure is the "two-factor authentication" procedure with a timely generated authentication code from the host access point (AP)/enhanced Node B (eNB) to acquire a temporary time-limited access to the CSG cell TA (thus the CSG cell AP allows certain special access codes). On successful temporary registration, only this one TA is assigned. Involved multiple TAs may also be assigned if a frequent TAU ping-pong effect is observed. The ping-pong effect in these circumstances occurs when the WTRU sends unnecessary TAUs when it is accessing a CSG cell.

All WTRUs in the CSG cell TA are considered stationary or low mobility. Accordingly, no periodic TAU or a long periodic TAU is proposed if the WTRUs are in the LTE_IDLE state. Paging to the allowed WTRUs in this TA can thus be directed to this one small cell or to only the assigned TAs, where the TAU ping-pong effect has often been observed.

Mechanisms for WTRU Mobility Detection

There are a number of mechanisms for WTRU mobility detection. The TAU counting, cell reselection counting, and positioning detection are coordinated efforts between a WTRU and the network. The WTRU performs the actions, such as detecting the change (e.g., TA change, cell coverage change, and position change) and signals the updates (TA or cell) or reports the position to the network. The network collects the statistics and determines the mobility state of a WTRU and assigns the TA(s) accordingly.

1. Number of TAUs. When the WTRU is transitioning from the low mobility state to the high mobility state, counting the number of TAUs can be used as the threshold to trigger the change. LTE WTRUs in the low mobility state are usually under the TAs with small or medium sizes, and when the WTRUs accelerate to a higher speed, the need to have a large TA may be measured via TAU counting. A number of TAUs (x) on different TAs within a fixed time (y) may be used as a mobility state trigger criterion.

2. Number of cell reselection decisions. When a WTRU in the high mobility state is reducing its speed (such as exiting from a highway), one measurement of the reduced mobility in the LTE_IDLE state is the number of cell reselections made by the WTRU. The LTE WTRUs cannot use the TAU counting in the high mobility state, since they are usually already assigned to large TAs to reduce the number of TAUs; therefore, the TAU count would not be an accurate mobility measure.

It should be noted that the cell reselection counting can also be used for determining whether the WTRU is transitioning from a low mobility state to a high mobility state.

3. WTRU positioning assisted mobility detection. Given that the LTE WTRUs will mostly have the positioning device support, the WTRU's mobility state can be measured with the positioning measurement results, i.e., the positioning longitudes and latitudes. The absolute positioning offsets obtained by the LTE WTRUs provide the network with the WTRU speed, which when combined with the TAU counting or the cell reselection counting is an accurate measure with respect to the mobility state detection.

4. WTRU mobility detection based on WTRU Doppler measurement. A WTRU may not have GPS capability, so the Doppler measurement by the WTRU can be used to detect the WTRU speed. This method can be combined with above-mentioned counting methods to obtain the WTRU mobility state information.

WTRU Mobility States and Mobility State Transitions

Figure 3:
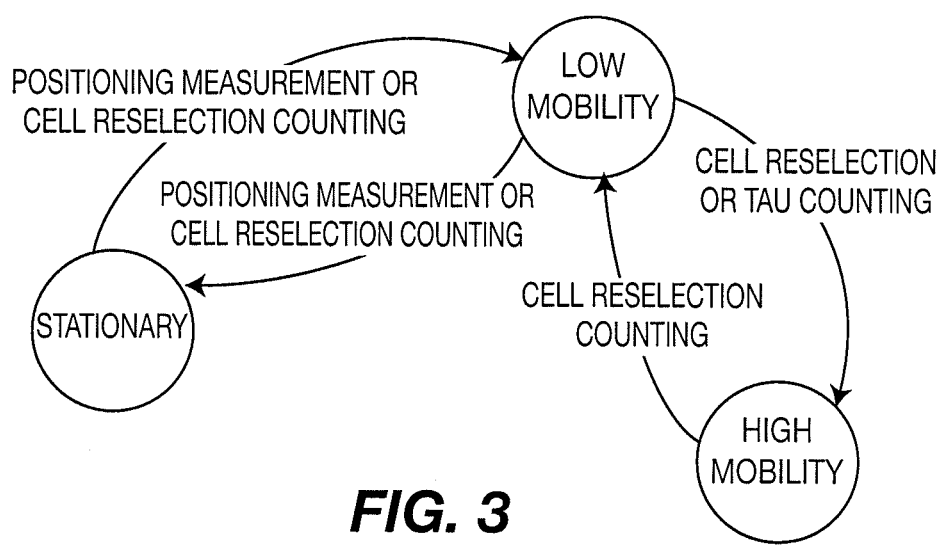
FIG. 3 is a mobility state transition diagram for a wireless transmit/receive unit (WTRU)

FIG. 3 is a mobility state transition diagram for a WTRU. The LTE WTRUs may be in a number of mobility states, including, but not limited to: stationary state, low mobility state, and high mobility state.

LTE WTRUs in the stationary state are stationary in the LTE_IDLE state when they are not moving or hardly moving in terms of crossing cell boundaries via cell reselections. As a result, these WTRUs rarely perform TAUs (except the periodic TAU regulated by a TAU timer). Therefore, these stationary LTE WTRUs can be assigned to a single small TA with one or a few cells to reduce the system paging load.

In the low mobility state, LTE WTRUs are moving or changing locations with low speed (e.g., reselecting new cells x times over a period of y seconds, or moving under z kmph), such as driving slowly in local streets or on congested highways. WTRUs in the low mobility state can be assigned to one or a few TAs (multiple TAs) or cells with overlapping TAs, where the TAs are small (i.e., one TA covers a number of cells) that the LTE_IDLE state WTRU's TAU load and the incoming call paging load are balanced.

In the high mobility state, LTE WTRUs are moving fast, such as driving along a highway and changing cells rapidly (exceeding x times per y seconds). LTE WTRUs in this state can be assigned to many TAs (multiple TAs) along the fast mobile path or to a large TA which covers many cells and many smaller TAs (overlapping TAs). When a WTRU is in the high mobility state, reducing the number of TAUs is an important consideration.

FIG. 4 is a flowchart of a method 400 for transitioning a WTRU from a low mobility state to a high mobility state. The method 400 begins with the WTRU in a low mobility state (step 402). The WTRU performs a TAU or a cell reselection (step 404) and counts the number of TAUs or the number of cell reselections (step 406). A determination is made whether the number of TAUs or the number of cell reselections is greater than a predetermined threshold (step 408). If the number of TAUs or the number of cell reselections is below the threshold, then the method continues performing TAUs or cell reselections (step 404). If the number of TAUs or the number of cell reselections exceeds the threshold (step 408), then the WTRU transitions to a high mobility state (step 410) and the method terminates (step 412).

FIG. 5 is a flowchart of a method 500 for transitioning a WTRU from a high mobility state to a low mobility state. The method 500 begins with the WTRU in a high mobility state (step 502). The WTRU performs a cell reselection (step 504) and counts the number of cell reselections (step 506). A determination is made whether the number of cell reselections is smaller than a predetermined threshold (step 508). When a WTRU is moving slower, it will be performing fewer cell reselections. If the number of cell reselections is greater than the threshold, then the method continues performing cell reselections (step 504). If the number of cell reselections is less than the threshold (step 508), then the WTRU transitions to a low mobility state (step 510) and the method terminates (step 512).

Figure 6:
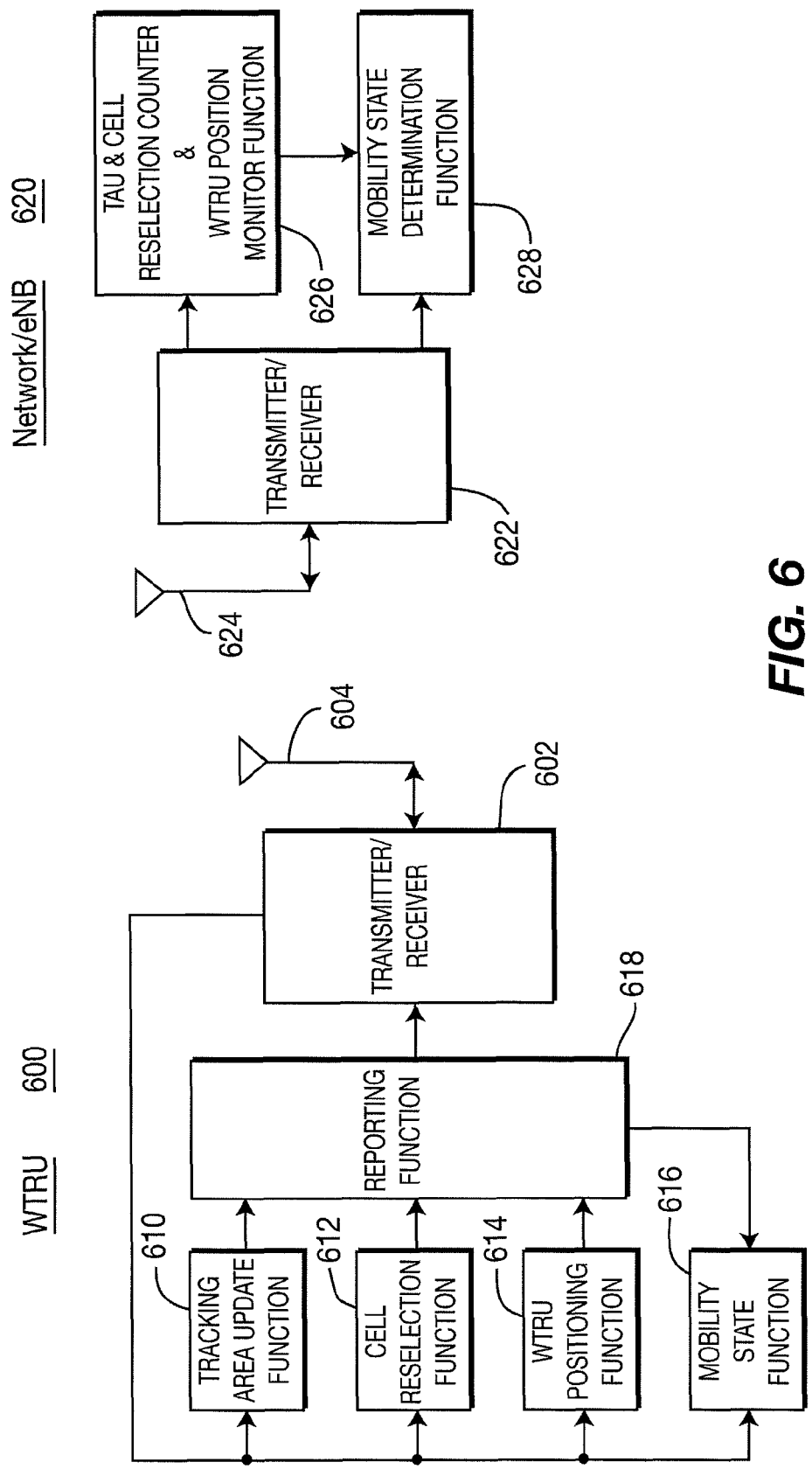
FIG. 6 is a block diagram of a WTRU configured to perform TAUs and cell reselections.

FIG. 6 is a block diagram of a WTRU 600 configured to perform TAUs and cell reselections and a network/eNB 620 to perform the mobility state determination function. The WTRU 600 includes a transmitter/receiver 602 and an antenna 604 connected to the transmitter/receiver 602. A TAU function 610, a cell reselection function 612, and a WTRU positioning function 614 are configured to perform TAUs, cell reselections, and WTRU position detections, respectively, and are in communication with the transmitter/receiver 602 via a reporting function 618. The WTRU also maintains a mobility state function 616 for its Idle Mode mobility management.

The network/eNB 620 includes a transmitter/receiver 622 and an antenna 624 connected to the transmitter/receiver 622. A TAU/cell reselection counter and WTRU position monitor function 626 is in communication with the transmitter/receiver 622 and is configured to count TAUs and/or cell reselections and to receive updates of the WTRU's current position. A mobility state determination function 628 is configured to maintain the mobility state of the WTRU 600 and is in communication with the counter 626 and the transmitter/receiver 622. The network/eNB 620 can perform both the method 400 and the method 500.

TA Timer Management

In most cases, when the WTRU is in the LTE_Active state, the network would have known the location of the WTRU through the cell update procedure which the WTRU must have performed. Hence, periodically updating the TA (via a timer) might not be necessary, unless the network wishes to do so. This could be done either explicitly or implicitly. Alternatively, the network could signal the timer and instruct the WTRU to start the timer when it transitions to the LTE_IDLE state.

In the LTE_IDLE state, it might be necessary for the network to have accurate TA level information of the WTRU to minimize the paging load. The WTRU could be in different mobility scenarios: stationary, low mobility, and high mobility. The network could allocate a single timer whose length is appropriate given the mobility state of the WTRU. Alternatively, the network may allocate multiple timers (e.g., one for each mobility state or one for each assigned TA) with their lengths adjusted so as to achieve optimum paging efficiency versus TAU efficiency and the WTRU may have the ability to start and re-start these timers given its estimate of its mobility state and/or current TA.

Scale of a TA

The network may choose to indicate to the WTRU, as part of its procedures, the relative size of each TA. In case of multiple TA lists, it may choose to do so using a TAU response. In general, the network may put this information on the SIB of a broadcast channel from a cell. Alternatively, the TA ID may reserve an indication field for the scope of the TA area, to facilitate the WTRU making the desired cell reselection decision at the TA boundaries based on its mobility state (from the mobility state function 616) and subsequently requesting the TAU with the choice of TA based on its mobility state (from the mobility state function 616).

Balancing TAU and Paging Traffic

Figure 7:
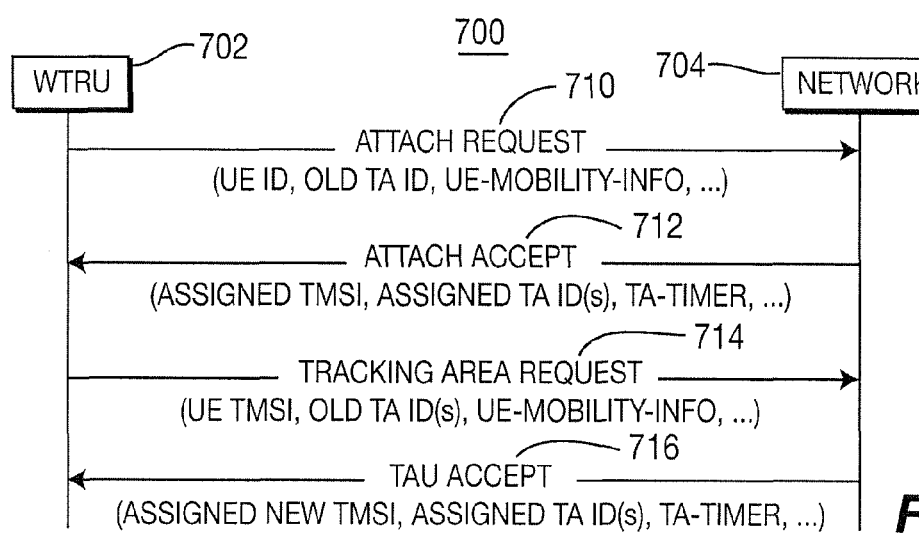
FIG. 7 is an exemplary signal diagram of TA operations.

From the system point of view, the WTRU TA assignment for balanced TAU and paging load by the network is accomplished with the help of the WTRU's mobility state information. FIG. 7 is an exemplary signal diagram 700 of TA operations between a WTRU 702 and a network 704.

When the WTRU 702 is turned on, it sends out an ATTACH Request message 710 or the LTE equivalent message to register with the network 704. The ATTACH Request message 710 includes the WTRU ID (Packet-Temporary Mobile Subscriber Identity (P-TMSI) or International Mobile Subscriber Identity (IMSI)) and the old TA ID last assigned before the WTRU 702 detached from the network 704. Optionally, the WTRU 702 can also send the "WTRU-mobility-info" information element (IE) with available information to help the network 704 assign TAs for the WTRU 702.

The network 704 accepts the registration request from the WTRU 702 and sends an ATTACH Accept message 712 to the WTRU 702. The message 712 includes the newly assigned TMSI and the new TA ID(s) for the TA that the WTRU 702 is assigned to, possibly based on the mobility information.

When the WTRU 702 performs a TAU, the WTRU can send a TA Request message 714, which includes the WTRU mobility information (such as the location change information, the cell reselection count, or the derived WTRU mobility state information) to the network 704 on the assignment to the TAs. The WTRU mobility information can also include the WTRU's mobility state, the number of cell reselections, WTRU position change measurement results, and the preferred TA-ID.

The network 704 responds to the TA Request message 714 by sending a TAU Accept message 716, which assigns new TAs with corresponding TA ID(s), TMSI(s), and TA timers, based on the WTRU mobility information contained in the TA Request message 714.

Although the features and elements are described in particular combinations, each feature or element can be used alone without the other features and elements or in various combinations with or without other features and elements. The methods or flow charts provided herein may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) for use in a wireless communication network, the WTRU comprising:
   circuitry configured to:
      receive a list of closed subscriber group (CSG) cell identities that the WTRU is permitted to access;
      camp on a CSG cell whose identity is not in the list; and
      on a condition that the WTRU is camping on a CSG cell whose identity is not on the list, transmit a tracking area update request message to the wireless communication network; and
      receive, in response, a tracking area update accept message from the wireless communication network;
   wherein the WTRU is assigned to a plurality of Long Term Evolution (LTE) tracking areas and further wherein the plurality of LTE tracking areas are used at the edges of at least one of the plurality of LTE tracking areas.

2. The WTRU of claim 1, wherein the circuitry is further configured to transmit an indication that the WTRU has selected a CSG cell whose identity is not on the list.

3. The WTRU of claim 1, wherein the circuitry is further configured to periodically update a tracking area of the WTRU.

4. The WTRU of claim 3, wherein the circuitry is further configured to periodically update the tracking area in response to an expiration of a timer.

5. The WTRU of claim 1, wherein the circuitry is further configured to transmit mobility information.

6. The WTRU of claim 1, wherein the tracking area update accept message includes a new list of tracking area IDs assigned to the WTRU.

7. The WTRU of claim 1, wherein the circuitry is further configured to exchange non-access stratum (NAS) signaling.

8. The WTRU of claim 1, wherein the circuitry is further configured to transmit the tracking area update request message to balance a signaling load.

9. A method performed by a wireless transmit/receive unit (WTRU) for use in a wireless communication network, the method comprising:
receiving a list of closed subscriber group (CSG) cell identities that the WTRU is permitted to access;
camping on a CSG cell whose identity is not in the list; and
on a condition that the WTRU is camping on a CSG cell whose identity is not on the list, transmitting a tracking area update request message to the wireless communication network; and
receiving, in response, a tracking area update accept message from the wireless communication network;
wherein the WTRU is assigned to a plurality of Long Term Evolution (LTE) tracking areas and further wherein the plurality of LTE tracking areas are used at the edges of at least one of the plurality of LTE tracking areas.

10. The method of claim 9, further comprising transmitting an indication that the WTRU has selected a CSG cell whose identity is not on the list.

11. The method of claim 9, further comprising periodically updating a tracking area of the WTRU.

12. The method of claim 11, wherein the periodically updating the tracking area further comprises periodically updating the tracking area in response to an expiration of a timer.

13. The method of claim 9, further comprising transmitting mobility information.

14. The method of claim 9, wherein the tracking area update accept message includes a new list of tracking area IDs assigned to the WTRU.

15. The method of claim 9, further comprising exchanging non-access stratum (NAS) signaling.

16. The method of claim 9, further comprising transmitting the tracking area update request message to balance a signaling load.

17. A wireless transmit/receive unit (WTRU) for use in a wireless communication network, the WTRU comprising:
circuitry configured to:
receive a list of closed subscriber group (CSG) cell identities that the WTRU is permitted to access;
camp on a CSG cell whose identity is not in the list;
on a condition that the WTRU is camping on a CSG cell whose identity is not on the list, transmit a tracking area update request message to the wireless communication network;
receive, in response, a tracking area update accept message from the wireless communication network; and
periodically update the tracking area in response to an expiration of a timer.

18. The WTRU of claim 17, wherein the circuitry is further configured to transmit an indication that the WTRU has selected a CSG cell whose identity is not on the list.

19. The WTRU of claim 17, wherein the circuitry is further configured to exchange non-access stratum (NAS) signaling.

20. The WTRU of claim 17, wherein the circuitry is further configured to transmit the tracking area update request message to balance a signaling load.

* * * * *